US008868484B2

(12) United States Patent
Aggarwal

(10) Patent No.: US 8,868,484 B2
(45) Date of Patent: Oct. 21, 2014

(54) EFFICIENTLY UPDATING ROWS IN A DATA WAREHOUSE

(75) Inventor: Nitin Aggarwal, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 502 days.

(21) Appl. No.: 12/832,084

(22) Filed: Jul. 8, 2010

(65) Prior Publication Data

US 2012/0011096 A1    Jan. 12, 2012

(51) Int. Cl.
*G06F 17/30* (2006.01)

(52) U.S. Cl.
CPC .... *G06F 17/30592* (2013.01); *G06F 17/30377* (2013.01)
USPC ........................................................ 707/602

(58) Field of Classification Search
USPC ........................................................ 707/602
See application file for complete search history.

(56) References Cited

U.S. PATENT DOCUMENTS

| | | | |
|---|---|---|---|
| 5,170,480 A | 12/1992 | Mohan et al. | |
| 5,530,855 A | 6/1996 | Satoh et al. | |
| 5,659,733 A | 8/1997 | Yamashita | |
| 5,995,980 A | 11/1999 | Olson et al. | |
| 6,032,158 A | 2/2000 | Mukhopadhyay et al. | |
| 6,289,334 B1 * | 9/2001 | Reiner et al. | 1/1 |
| 6,895,471 B1 * | 5/2005 | Tse et al. | 711/118 |
| 6,980,988 B1 | 12/2005 | Demers et al. | |
| 2003/0074348 A1 * | 4/2003 | Sinclair et al. | 707/2 |
| 2009/0187602 A1 | 7/2009 | Chen et al. | |

OTHER PUBLICATIONS

"Wayne Eckerson and Colin White", "Evaluating ETL and Data Integration Platforms", Evolve Computer Solutions, Downloaded Circa, Mar. 1, 2010, p. 1-40.

* cited by examiner

*Primary Examiner* — Amresh Singh
(74) *Attorney, Agent, or Firm* — Narendra Reddy Thappeta

(57) ABSTRACT

An aspect of the present invention facilitates efficient updating of rows in a data warehouse. In one embodiment, a sequence of identifiers is allocated to rows of data elements received earlier, and then inserted along with the received data elements in a table according to the defined by the sequence of identifiers. On receiving data elements as updates to the rows having associated identifiers, the received data elements are sorted according to the order of the associated identifiers and updates of the rows are performed successively in the sorted order of identifiers. According to another aspect, the above features are performed when (target) fact/dimension tables in the data warehouse are sought to be updated based on transformations/computations performed on data in other (source) fact/dimension tables.

20 Claims, 7 Drawing Sheets

| | Region_Wid 511 | Area 512 | City 513 | Country 514 | Total_Sales 515 | | Total_Sales 515A |
|---|---|---|---|---|---|---|---|
| 531 → | 2001 | East | Bangalore | India | | | 60,500 |
| 532 → | 2002 | West | Bangalore | India | | | 20,000 |
| 533 → | 2003 | North | Bangalore | India | | | 12,000 |
| 534 → | 2004 | South | Bangalore | India | | | 34,000 |

410

| | Sales_Wid 551 | Date_Time 552 | Area_Wid 553 | Product_Name 554 | Quantity 555 | Total_Amount 556 |
|---|---|---|---|---|---|---|
| 571 → | 171 | 12/3/2010 | 2001 | Axle | 1 | 28,000 |
| 572 → | 172 | 22/2/2010 | 2003 | Bumpers | 2 | 12,000 |
| 573 → | 173 | 28/4/2010 | 2002 | Wheels | 4 | 20,000 |
| 574 → | 174 | 22/2/2010 | 2001 | Wheels | 2 | 10,000 |
| 575 → | 175 | 1/5/2010 | 2001 | Windshield | 3 | 22,500 |
| 576 → | 176 | 2/5/2010 | 2004 | Bumpers | 1 | 6,000 |
| 577 → | 177 | 8/4/2010 | 2004 | Axle | 1 | 28,000 |

| Product_Wid (611) | Product_Name (612) | In_Quantity (613) | Out_Quantity (614) |
|---|---|---|---|
| 8104 ← 631 | Axle | | |
| 8105 ← 632 | Bumpers | | |
| 8106 ← 633 | Wheels | | |
| 8107 ← 634 | Windshield | | |

| Out_Quantity (614A) |
|---|
| 2 |
| 3 |
| 6 |
| 3 |

FIG. 6B

| Product_Wid | Quantity |
|---|---|
| 8104 | 1 |
| 8105 | 2 |
| 8106 | 4 |
| 8106 | 2 |
| 8107 | 3 |
| 8105 | 1 |
| 8104 | 1 |

US 8,868,484 B2

EFFICIENTLY UPDATING ROWS IN A DATA WAREHOUSE

BACKGROUND OF THE INVENTION

1. Technical Field

The present disclosure relates to database technologies, and more specifically to efficiently updating rows in a data warehouse.

2. Related Art

Data warehouses refer to repositories which store data in a form conducive for analysis. The data can be viewed as historical data, in contrast to transactional data which is stored in (transaction) databases that store data in a form conducive for data manipulation. As is well known, data warehouses store data in more redundant forms such as star schemas, to facilitate efficient access to data for analysis. The schemas generally define tables with appropriate relationships, with each table in turn having rows and columns.

There is a general need to update rows in a data warehouse. Update generally entails modification of (column) values in one or more pre-existing rows of a table in the data warehouse. It is generally well known that update operations in data warehouse environments are resource intensive, i.e., consume processing/memory resources (and thus be considered expensive). Accordingly, it may be desirable that the updating of rows in data warehouses be made more efficient.

BRIEF DESCRIPTION OF THE DRAWINGS

Example embodiments of the present invention will be described with reference to the accompanying drawings briefly described below.

FIG. 5 illustrates the manner in which updating of rows (in a target table) in a data warehouse when the corresponding allocated identifiers are available in a source table is performed in one embodiment.

FIGS. 6A and 6B together illustrate the manner in which updating of rows (in a target table) in a data warehouse when the corresponding allocated identifiers are not available in a source table is performed in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention facilitates efficient updating of rows in a data warehouse. In one embodiment, a sequence of identifiers is allocated to rows of data elements received earlier, and then inserted along with the received data elements in a table according to the defined by the sequence of identifiers. On receiving data elements as updates to the rows having associated identifiers, the received data elements are sorted according to the order of the associated identifiers and updates of the rows are performed successively in the sorted order of identifiers.

According to another aspect, the above features are performed when (target) fact/dimension tables in the data warehouse are sought to be updated based on transformations/computations performed on data in other (source) fact/dimension tables.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
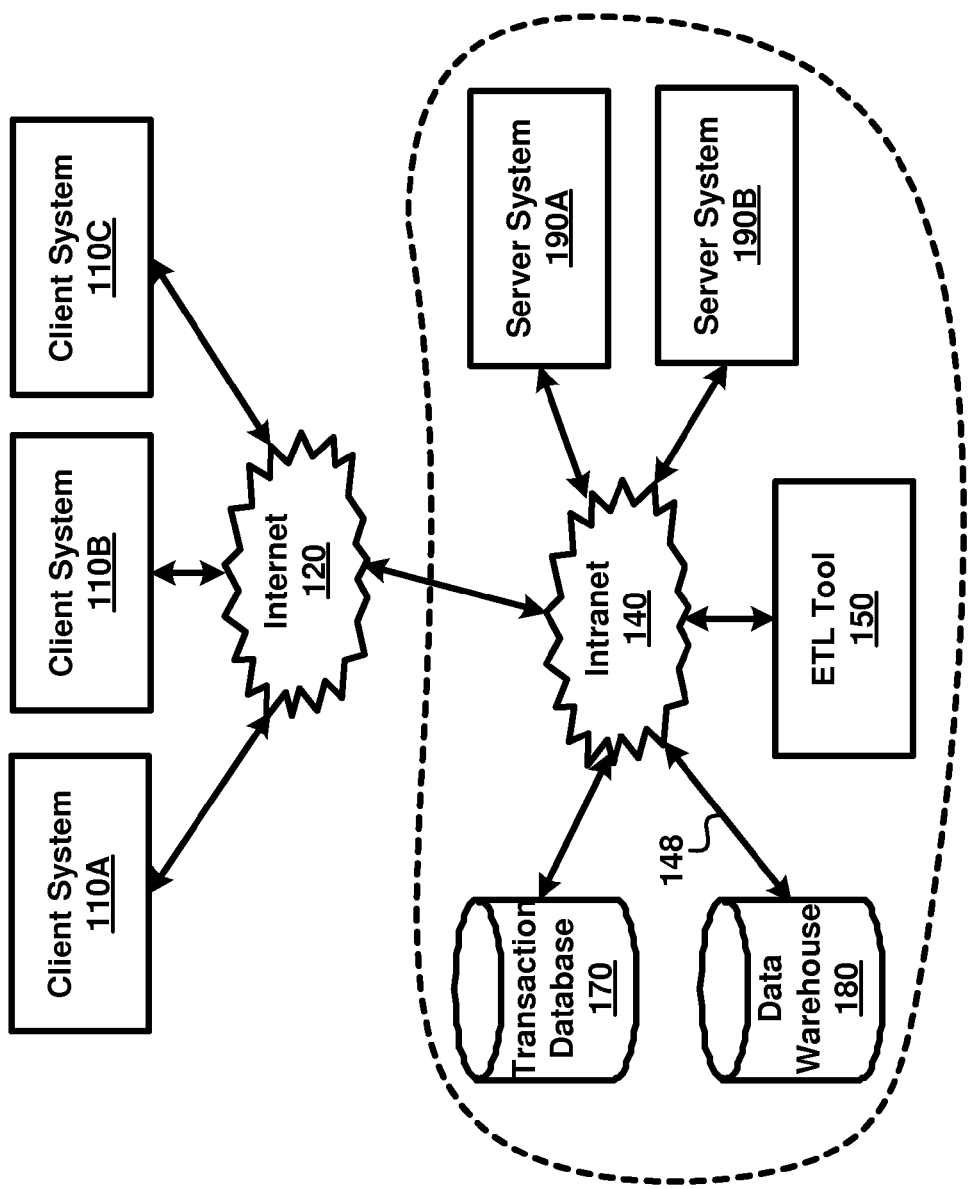
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110C, Internet 120, intranet 140, extract-transform-load (ETL) tool 150, transaction database 170, data warehouse 180 and server systems 190A-190B.

Merely for illustration, only representative number/type of systems is shown in FIG. 1. Many environments often contain many more systems, both in number and type, depending on the purpose for which the environment is designed. Each system/device of FIG. 1 is described below in further detail.

Intranet 140 represents a network providing connectivity between server systems 190A-190B, transaction database 170, data warehouse 180, and ETL tool 150, all provided within an enterprise (shown with dotted boundaries). Internet 120 extends the connectivity of these (and other systems of the enterprise) with external systems such as client systems 110A-110C.

Each of intranet 140 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by Internet 120 and intranet 140.

Each of client systems 110A-110C represents a system such as a personal computer, workstation, mobile station, etc., used by end users to generate (client) requests to business/enterprise applications executing in server systems 190A-190B. The requests may be generated using appropriate user interfaces. In general, a client system requests an application for performing desired tasks and receives corresponding responses containing the results of performance of the requested tasks. Each request is sent in the form of an IP packet directed to the desired server system, with the IP packet including data identifying the desired tasks in the payload portion.

Each of transaction database 170 and data warehouse 180 represents a non-volatile (persistent) storage facilitating storage and retrieval of a collection of data by business/enterprise applications executing in server systems 190A-190B. In one embodiment, each of transaction database 170 and data warehouse 180 is implemented using relational database technologies and therefore provides storage and retrieval of data using structured queries such as Structured Query Language (SQL). SQL refers to a special-purpose, generally non-procedural language that supports the definition, manipulation, and control of data in systems implementing relational database technologies. However, transaction database 170 and data warehouse 180 may be implemented using other technologies (e.g., procedural language, hierarchical databases) in alternative embodiments.

Transaction database 170 maintains transaction data related to business transactions (for example, the sale transaction, the current inventory, etc.) in real time. Transaction database 180 generally enables the addition, modification, and deletion of the stored data by different users simultaneously. In contrast, data warehouse 180 stores historical data related to the transactions performed by the business/enterprise applications such as the total sales for each region/year, etc. Data warehouse 180 generally contains data extracted from different external data sources (such as transaction database 170) at pre-defined intervals, for example, at end of day, month, etc.

Each of server systems 190A-190B represents a server, such as a web/application server, executing business/enterprise applications capable of performing tasks requested by end users using one of client systems 110A-110C. A server system may perform the tasks on data maintained internally or on external data (e.g., stored in transaction database 170) and then send the result of performance of the tasks to the requesting client system.

In one embodiment, some of the business applications executing in server systems 190A-190B facilitate end users (such as managers, business analysts, etc. using client systems 110A-110C) to perform various analyses as well as to generate various reports based on the data stored in data warehouse 180. An example of such a business application is Oracle Business Intelligence Suite Enterprise Edition Plus (OBIEE) available from Oracle Corporation, the (intended) assignee of the subject application.

Accordingly, there is general need to extract data from various data sources such as transaction database 170 and to load the extracted data (after performing desired transformations) to data warehouse 180.

ETL tool 150 facilitates the performance of one or more of such combinations of extract, transform and load steps. In general, ETL tool 150 transforms the data organized in the form of normalized schemas in transaction database 170 to corresponding data organized in more redundant forms such as star schemas, as is well known in the arts. The storing of the data in data warehouse 180 may entail addition/insertion of new rows, or updating some of the existing (already inserted) rows in the tables in data warehouse 180. Some of the challenges in such update operation are described below with respect to the example data warehouse implementation of below.

3. Example Data Warehouse Implementation

Figure 2:
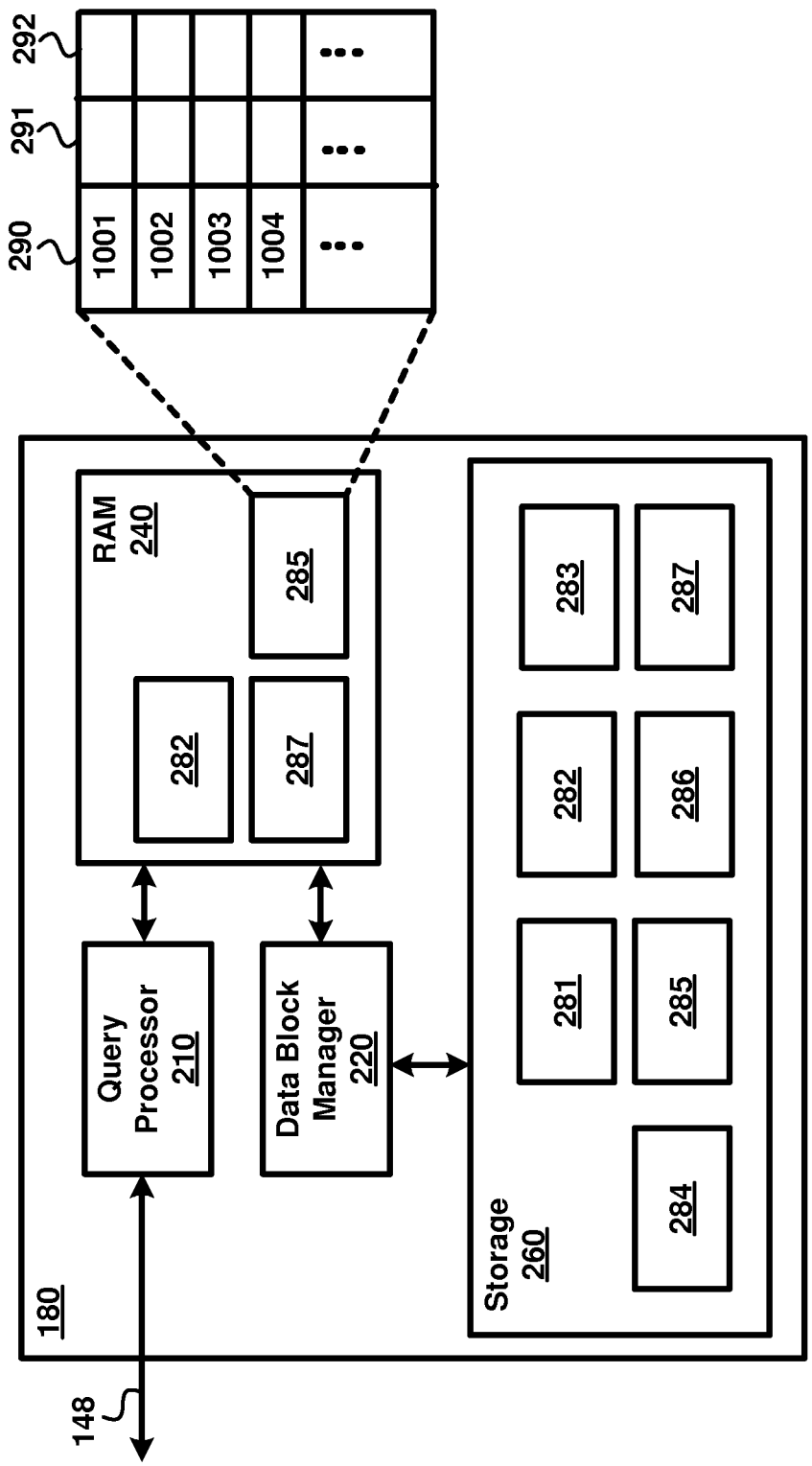
FIG. 2 is a block diagram illustrating the manner in which a data warehouse is implemented in one embodiment.

FIG. 2 is a block diagram illustrating the manner in which a data warehouse (180) is implemented in one embodiment.

Data warehouse 180 is shown containing query processor 210, data block manager 220, random access memory (RAM) 240 and storage 260 (shown containing data blocks 281-287). Each of the blocks is described in detail below.

Query processor 210 receives (via path 148) queries directed to data warehouse 180 and performs operations (such as insertion of new row, update of existing row) corresponding to the received queries on the data stored in storage 260, in particular, the specific storage blocks of interest. The queries may be received from applications executing in server systems 190A-190B. Alternatively, the queries may be received from ETL tool 150, as part of loading the data to data warehouse 180 (after extraction from transaction database 170, and possibly performing transformations).

Storage 260 represents a non-volatile (persistent) storage such as a hard disk, etc. used to store the data in data warehouse 180. The data is typically stored in the form of one or more data blocks (281-287), usually of the same size and having a similar structure, to facilitate efficient storage/retrieval of a collection of data. Each data block contains one or more rows which are stored sequentially (one row after the other). In other words, the data elements corresponding to the columns of the first row are stored first, followed by the data elements corresponding to the columns of the second row, etc. (though the data is shown in a tabular format for data block 285 for easy understanding).

RAM 240 represents a volatile memory used for temporary storage of the data blocks, in particular, for the performance of operations on the data in the data blocks by query processor 210. The number of data blocks that may be stored in RAM 240 at any time instance is generally small (in the order of 100-1000) as compared to the number of data blocks in storage 260 (in the order of 10000+).

Accordingly, data block manager 220 is designed to determine the data blocks of interest (e.g., 282, 285 and 287) for a query processed by query processor 210 and to read into RAM 240 the determined data blocks from storage 260, thereby facilitating the performance of the operations on the data blocks of interest by query processor 210. Data block manager 220 also stores/writes the modified data blocks (containing the results of the performance of the operations) back to storage 260, thereby ensuring that the results of the operations are persisted.

Thus, data block manager 220 may read and write multiple data blocks during the performance of different operations. Since the number of blocks that can be stored in RAM 240 is small compared to the number of blocks in storage 260, data block manager 220 may write some of the data blocks from RAM 240 back to storage 260 and read new data blocks of interest during the performance of an operation, even though the data blocks written back may be required at a later time. The specific data blocks to be written back (in spite of the processing being not completed) may be determined according to pre-defined criteria (a common example being LRU or least recently used).

It may be appreciated that the efficiency (in terms of the resources consumed) of an operation is determined by the number of data blocks that need to read/write (in general, accessed by data block manager 220) for the performance of the operation, with a lower number indicating a higher efficiency. In general, higher efficiency may be achieved by ensuring that data blocks are accessed fewer times (ideally only once) during the performance of the operation.

In one embodiment, query processor 210 allocates a sequence of unique identifiers (for example, 1001, 1002, 1003, etc.) for each of the rows (of a table) sought to be inserted, and then store the allocated identifier as part of the corresponding row. Allocation to a specific row entails choosing an identifier from the sequence that has not been previously associated to any other row and then associating the chosen identifier to the specific row.

While the sequence is described as being in ascending order merely for illustration, other ordered set of identifiers (with or without being consecutive) can be used, without departing from several aspects of the present invention, as will be apparent to one skilled in the relevant arts by reading the disclosure provided herein. Data block manager 220 may determine the data blocks of interest based on the unique identifier allocated to each row, and accordingly may maintain data which indicates which of the identifiers are stored in which of the data blocks.

The allocation of identifiers from a pre-defined sequence to the rows and the storage of the rows successively according to the order of the sequence ensures that the insertion operation is performed with the optimal number of data blocks accesses (since each data block is accessed once). For example, data block 285 is shown containing columns 290-292, with column 290 storing the unique identifier allocated (by query processor 210) for the corresponding row (and accordingly, making column 290 a primary/candidate key). It may be observed that the rows are stored according to the order (e.g., 1004 after 1002, 1002 after 1001, etc.) defined by the sequence of the allocated identifiers.

However, update operations may still be inefficient and result in a large number of data block accesses, in particular, when the update operations are "discrete" (that is, when the update operations against the same data block/table are received as separate queries updating one row at a time also called as row-by-row update, in contrast to a bulk update where only a single query is received which updates all the desired rows in a data block/table in a single execution).

For example, assuming that each of data blocks 281-287 stores sequentially 100 rows of a single table (that is, block 281 stores rows with identifiers 1001 to 1100, block 282 stores rows with identifiers 1101 to 1200, and so on), discrete update operations for rows 1022, 1650 and 1077 may result in data block manager 220 reading data blocks 281 and 287 into RAM 240 for updating rows 1022 and 1650, then writing data block 281 back to storage 260 (due to needing other data blocks to be read into RAM 240) and then again reading data block 281 into RAM 240 for updating row 1077. It may be observed that the same data block (281) is read/accessed multiple times into RAM 240, thereby requiring more resources (such as CPU cycles, a larger RAM, etc.) to be spent for performing the update operations.

ETL tool 150, provided according to several aspects of the present invention, is designed to efficiently update the rows in a data warehouse (180), in particular, when loading the data into the data warehouse (180) after extracting (from transaction database 170) and transforming, as described below with examples. Though ETL tool 150 is shown as an external system, in alternative embodiments, ETL tool 150 (and the features of the present invention) may be provided internal to data warehouse 180 (or server systems 190A-190B), as will be apparent to one skilled in the relevant arts by reading the disclosure herein.

4. Efficiently Updating Rows in a Data Warehouse

Figure 3:
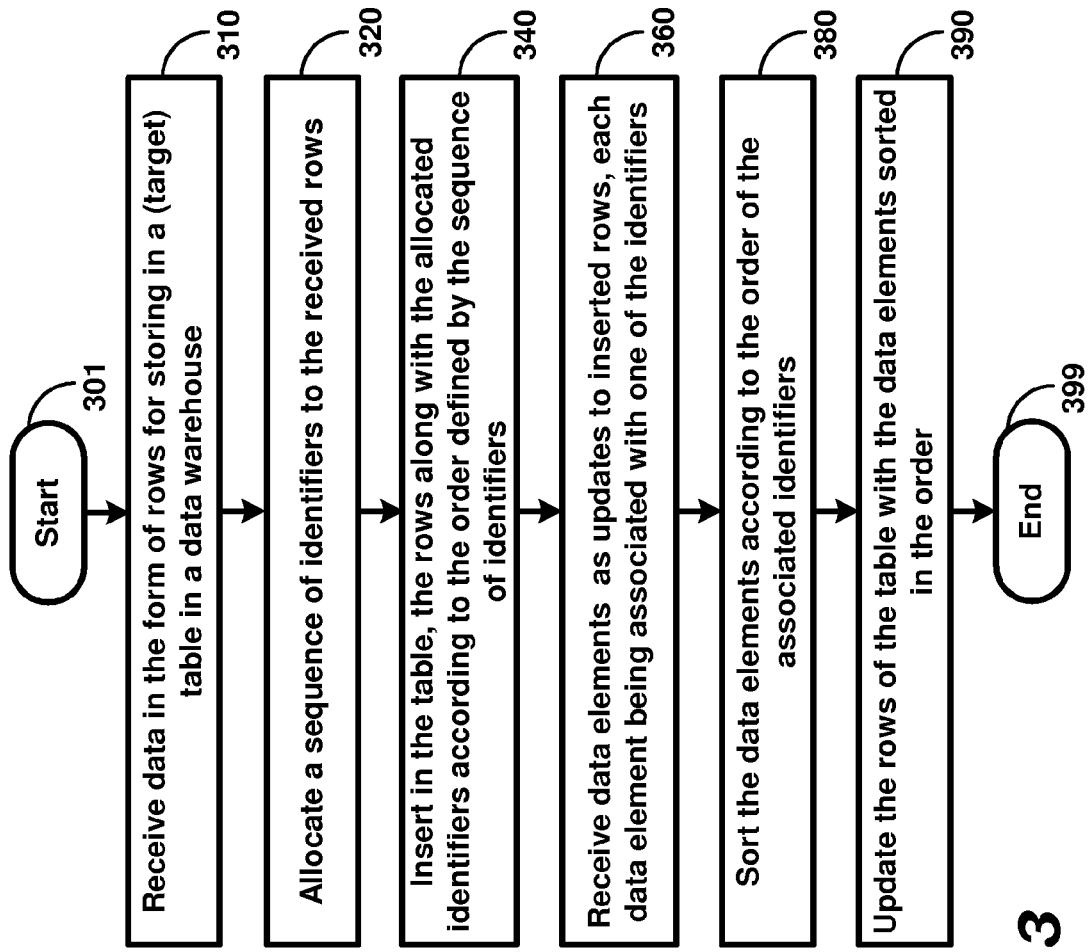
FIG. 3 is a flow chart illustrating the manner in which updating of rows in a data warehouse is performed according to an aspect of the present invention.

FIG. 3 is a flow chart illustrating the manner in which updating of rows in a data warehouse is performed according to an aspect of the present invention. The flowchart is described with respect to FIGS. 1 and 2 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 310, ETL tool 150 receives data in the form of rows for storing in a (target) table in a data warehouse. The data may be received for loading in data warehouse 180 as a part of an extract-transform-load step, performed on transactional data stored in transaction database 170. ETL tool 150 may then generate (SQL) queries directed to data warehouse 180 for inserting the received data.

In step 320, a sequence of identifiers is allocated to the received rows, for example, as described above. In step 340, rows containing the received data as well as the allocated identifiers are inserted in the table. Each inserted row thus contains both the received data and the allocated identifier. The rows are inserted according to the order defined by the sequence of identifiers. In one embodiment, steps 320 and 340 are performed by query processor 210 in response to receiving corresponding queries from ETL tool 150.

In step 360, ETL tool 150 receives data elements as updates to the inserted rows, each data element being associated with one of the allocated identifiers. The association information may be present in the received data elements or needs to be derived from other tables. The data elements may be received as part of a transform-load step performed for the data extracted from transaction database 170.

In step 380, ETL tool 150 sorts the data elements (of step 360) according to the order of the associated identifiers. In other words, if the order is an ascending order, the data elements are sorted in ascending order. It should be appreciated that such sorting ensures that the update information is available in the same order as that in which the rows of the target table were inserted (i.e., currently present) in data warehouse 180.

In step 390, ETL tool 150 updates the rows of the table successively with the sorted data elements. The term "successively" implies that the rows are updated one after the other adhering to the sorted order. Such updates may be performed by sending appropriate SQL queries directed to data warehouse 180. Due to the use of the same order in inserting as well as updating described above, the number of data blocks accessed for updating is reduced, thereby reducing the resource requirements. The flowchart ends in step 399.

Thus, in the above noted example of the update operations for rows 1022, 1650 and 1077, the sorting of the data elements by the associated identifiers causes the updates to be performed successively in the order 1022, 1077 and 1650. The three updates are then performed successively (i.e., first 1022, then 1077 and finally 1650) by reading data blocks 281 and 287 into RAM 340 and as such the writing/reading of block 281 due to needing other data blocks to be read in RAM 340 is avoided. Accordingly, the updating of rows in data warehouse 180 is made more efficient.

The manner in which updating of rows in a data warehouse (180) may be performed according to the steps of FIG. 3 is described below with examples.

5. Illustrative Example

Figure 4:
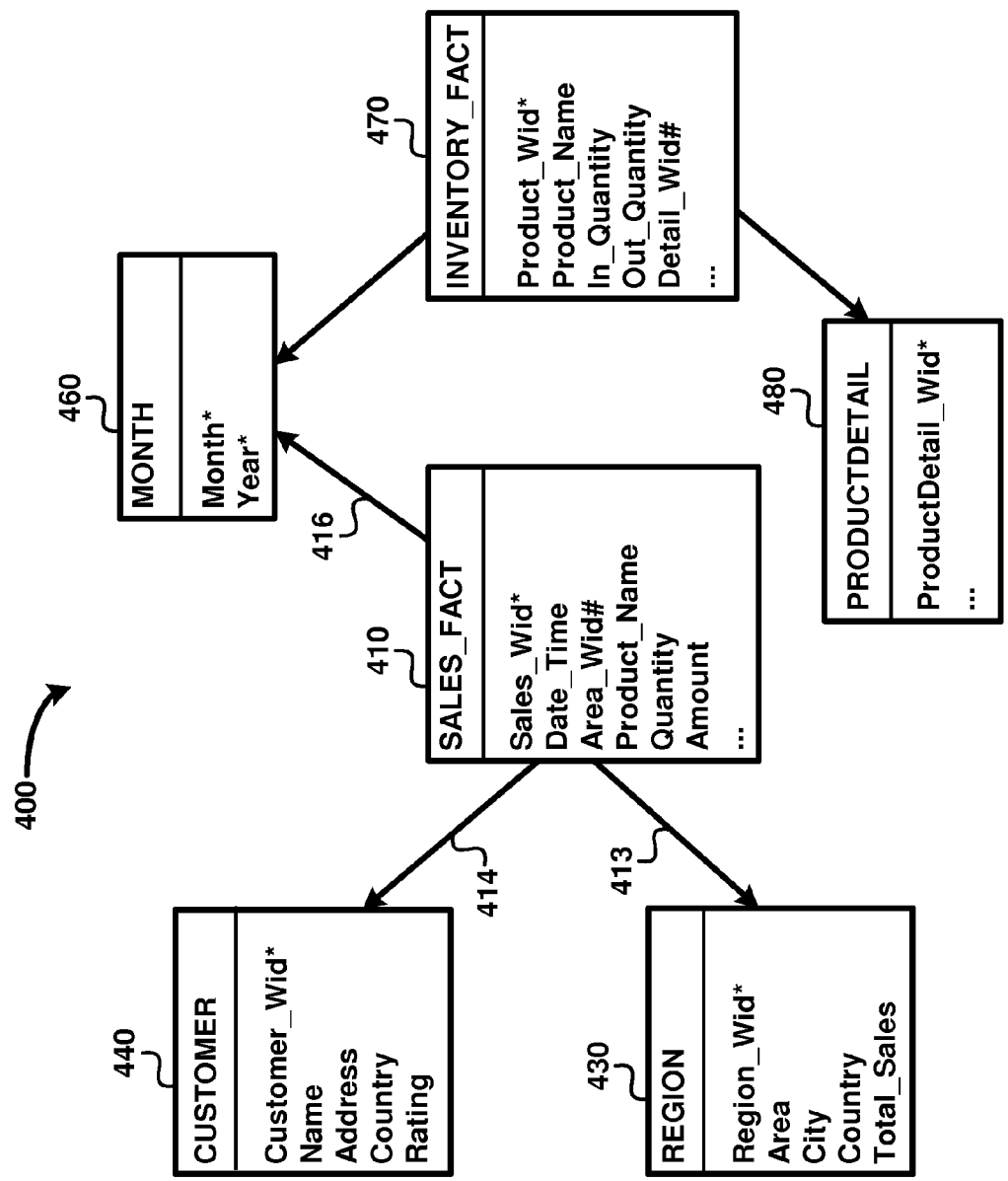
FIG. 4 depicts a portion of a star schema according to which data is maintained in a data warehouse in one embodiment.

FIGS. 4, 5 and 6 together illustrate the manner in which updating of rows in a data warehouse (180) is performed in one embodiment. Each of the Figures in described in detail below.

FIG. 4 depicts a portion of a star schema (400) according to which data is maintained in a data warehouse (180) in one embodiment. Broadly, in a star schema, data is organized in terms of fact tables and dimension tables, with fact tables containing detailed data of interest (e.g., transactions, etc.) and the dimension tables containing attributes (or fields) used to constrain and group data when performing data warehousing queries. Each fact table may be viewed as having multiple dimensions, with each dimension represented by a corresponding dimension table.

Accordingly, star schema 400 is shown containing multiple fact and dimension tables, with each table shown as a corresponding box having the name of the table (the text "_FACT" indicating a fact table) and also the names of some of the columns/fields contained in the table (with the primary key of the table indicated by *, and a foreign key column in the table indicated by #). Data is stored in each of the tables in the form of one or more rows, with each row containing data elements (values) corresponding to the columns specified for the table.

Thus, star schema 400 specifies two fact tables 410 and 470 respectively named "SALES_FACT" and "INVENTORY_FACT" and four dimension tables 430, 400, 460 and 480 respectively named "REGION", "CUSTOMER", "MONTH" and "PRODUCTDETAIL". Fact table 410 is shown linked (arrows 413, 414, 416) to the three dimension tables 430, 440 and 460, while fact table 470 is shown linked to the dimension tables 460 and 480. The linking of the fact tables to the dimension tables may be performed by including in the fact table, a foreign key column matching the primary key (such as Region_Wid, Customer_Wid, etc.) of the desired dimension table. The term "matching" implies that the values/data elements that can be stored in the foreign key column are restricted to the values/data elements stored in the primary key column.

For example, link 413 is formed by including in fact table 410, the foreign key column "Area_Wid" matching the primary key "Region_Wid" of dimension table 430 (in other words, requiring the values in the "Area_Wid" column to be one of the values in the "Region_Wid" column). The other links between the fact and dimension tables may similarly be formed, though the corresponding foreign key columns are not shown in FIG. 4 for conciseness.

ETL tool 150 may be designed to extract data from transaction database 170 and to store the extracted (and possibly transformed) data in data warehouse 180 according to star schema 400. In one embodiment, ETL tool 150 is designed to first load data (insert rows) in the dimension tables and the fact tables (including the values in the foreign key columns), and then to update the rows in the desired "target" fact/dimension tables based on transformations/computations (specified by a user/developer) performed on the data stored in "source" fact/dimension tables.

ETL tool 150 performs the updating of the rows (in the target tables) in data warehouse 180 according to several aspects of the present invention. Thus, ETL tool 150 may first need to determine the data elements to be updated to the rows and the associated identifiers allocated during insertions of the rows (step 360). In one scenario, the allocated identifiers are available in the source table (for example, as the values of a foreign key column), as described below with examples.

6. Updating Rows when Allocated Identifiers are Available in Source Table

FIG. 5 illustrates the manner in which updating of rows (in a target table) in a data warehouse (180) when the corresponding allocated identifiers are available in a source table is performed in one embodiment.

In particular, FIG. 5 depicts portions of the data stored in REGION dimension table 430 and SALES_FACT fact table 410 after data has been inserted in the form of rows by ETL tool 150 (as part of loading data warehouse 180). In particular, dimension/region table 430 is shown containing rows 531-534, each row being uniquely identified by the corresponding allocated identifier stored in column 511 "Region_Wid" (and accordingly is a primary key for dimension table 430).

Similarly, fact/sales table 410 is shown containing rows 571-577, whose corresponding allocated identifier is shown in column 551 "Sales_Wid". Column 553 "Area_Wid" is a foreign key column matching the primary key column 511 "Region_Wid" of the region table 430, and accordingly is required to have values which are already stored in column 511. The storage of the appropriate values in column 553 may be performed by ETL tool 150 during the insertion of the rows in sales table 410.

It may be observed that there are no values (indicated by the blank/empty space) specified for column 515 "Total_Sales" in region table 430. A user/developer may specify that the value of column 515 for each of rows 531-534 is to be determined as the sum of the values in column 556 "Total_Amount" grouped by the region identifier (values of column 511). Accordingly, ETL tool 150 may be required to update the rows 531-534 of region/target table 430 with data elements computed based on some of the rows in sales/source table 410.

It may be observed that the identifiers allocated in the target table are available in the source table (as values of foreign column 553). Accordingly, ETL tool 150 performs the retrieval of the appropriate rows (571-577), computes the data elements (the sum of the values in column 556) to be updated in the target tables, and also determines the associated identifiers as the corresponding values in foreign column 553 in each of rows 571-577. ETL tool 150 then sorts the data elements according to the order of the associated identifiers.

In one embodiment, ETL tool 150 performs the above steps of retrieving, computing and sorting by executing an SQL query, as shown below:

```
SELECT
  SUM (Sales_F.Total_Amount), Sales_F.Area_Wid
FROM
  SALES_FACT Sales_F
WHERE
  Sales_F.Sales_Wid > 0 and Sales_F.Area_Wid > 0
GROUP BY
  Sales_F.Area_Wid
ORDER BY Sales_F.Area_Wid
```

It may be observed that the query indicates that the sum of the values in column 556 "Total_Amount" is to be computed and also that the corresponding values in column 553 "Area_Wid" are to be retrieved. The "ORDER BY" keyword ensures that the resultant data elements (summed values such as 60500, 20000, etc.) and the corresponding associated identifiers (values 2001, 2002, etc.) are sorted (by default, in the ascending order) according to the order in of the associated identifiers.

ETL tool 150 executes the above query and stores the sorted data elements in a staging/temporary table in data warehouse 180. ETL tool 150 may then generate queries for updating the rows (531-534) in the target/region table 430. Query processor 210 ensures that the update operations are successively performed in the sorted order (i.e., first 2001, then 2002, thereafter 2003, etc.), thereby ensuring efficient updating of the rows in data warehouse 180. Column 515A in FIG. 5 depicts the values that may be present in column 515 after the updates of rows 531-534 with the corresponding computed values are successfully performed.

It may be appreciated that the above steps may be performed for any two tables that have a foreign key in one table (such as a fact table) matching a primary key in the other table (such as a dimension table). However, there may be scenarios (for example, two fact tables) where the allocated identifiers are not available in the source table, as described below with examples.

7. Updating Rows when Allocated Identifiers are not Available in Source Table FIGS. 6A and 6B together illustrate the manner in which updating of rows (in a target table) in a data warehouse (180) when the corresponding allocated identifiers are not available in a source table is performed in one embodiment.

FIG. 6A depicts portions of the data stored in INVENTORY_FACT fact table 470 after data has been inserted in the form of rows by ETL tool 150 (as part of loading data warehouse 180). Fact/inventory table 470 is shown containing rows 631-634, whose corresponding allocated identifier is shown in column 611 "Product_Wid". A user/developer may specify that the value of column 614 "Out_Quantity" for each of rows 631-634 in the inventory/target table 470 is to be determined as the sum of the values in column 555 "Quantity" based on the common value in column 554 "Product_Name" of the sales/source table 410.

It may be observed that the allocated identifiers specified in column 611 "Product_Wid" (according to which, the rows are inserted in inventory/target table 470) are not available in the sales/source table 410. However, it may be further observed that sales table 410 and inventory table 470 shares a common column named "Product_Name" (columns 554 and 612).

Accordingly, ETL tool 150 performs a join between the source sales table 410 and the target inventory table 470 on the common column "Product_Name" to collate the corresponding identifiers in column 611 of table 470 with the data elements (values in column 555) of table 410, as is well known in the arts. FIG. 6B depicts the manner in which data elements (in column 555 "Quantity" of the source sales table 410 is collated with the allocated identifiers (in column 611 "Prodcut_Wid") of the target inventory table 470 is one embodiment.

ETL tool 150 then performs the above steps of retrieving, joining, computing and sorting by executing an SQL query, as shown below:

```
SELECT
    SUM(Sales_F.Quantity), Inv_F.Product_Wid
FROM
    INVENTORY_FACT Inv_F, SALES_FACT Sales_F
WHERE
    Sales_F.Sales_Wid > 0 and Inv_F.Product_Wid > 0 and
```

-continued

```
Sales_F.Product_Name = Inv_F.Product_Name
GROUP BY
    Sales_F.Product_Name
ORDER BY
    Inv _F.Product_Wid
```

It may be observed that the condition "Sales_F.Product_Name=Inv_F.Product_Name" in the WHERE clause of the query causes a join to be performed between the sales and inventory product tables, while the "ORDER BY" keyword ensures that the resultant data elements (summed values such as 2, 3, 6, etc.) and the corresponding associated identifiers (values 8104, 8105, etc.) are sorted (by default, in the ascending order) according to the order in of the associated identifiers. Column 614A in FIG. 6A depicts the values that may be present in column 614 after the updates of rows 631-634 with the corresponding computed values are successfully performed.

It should be appreciated that the features described above can be implemented in various embodiments as a desired combination of one or more of hardware, executable modules, and firmware. The description is continued with respect to an embodiment in which various features are operative when the software instructions described above are executed.

8. Digital Processing System

Figure 7:
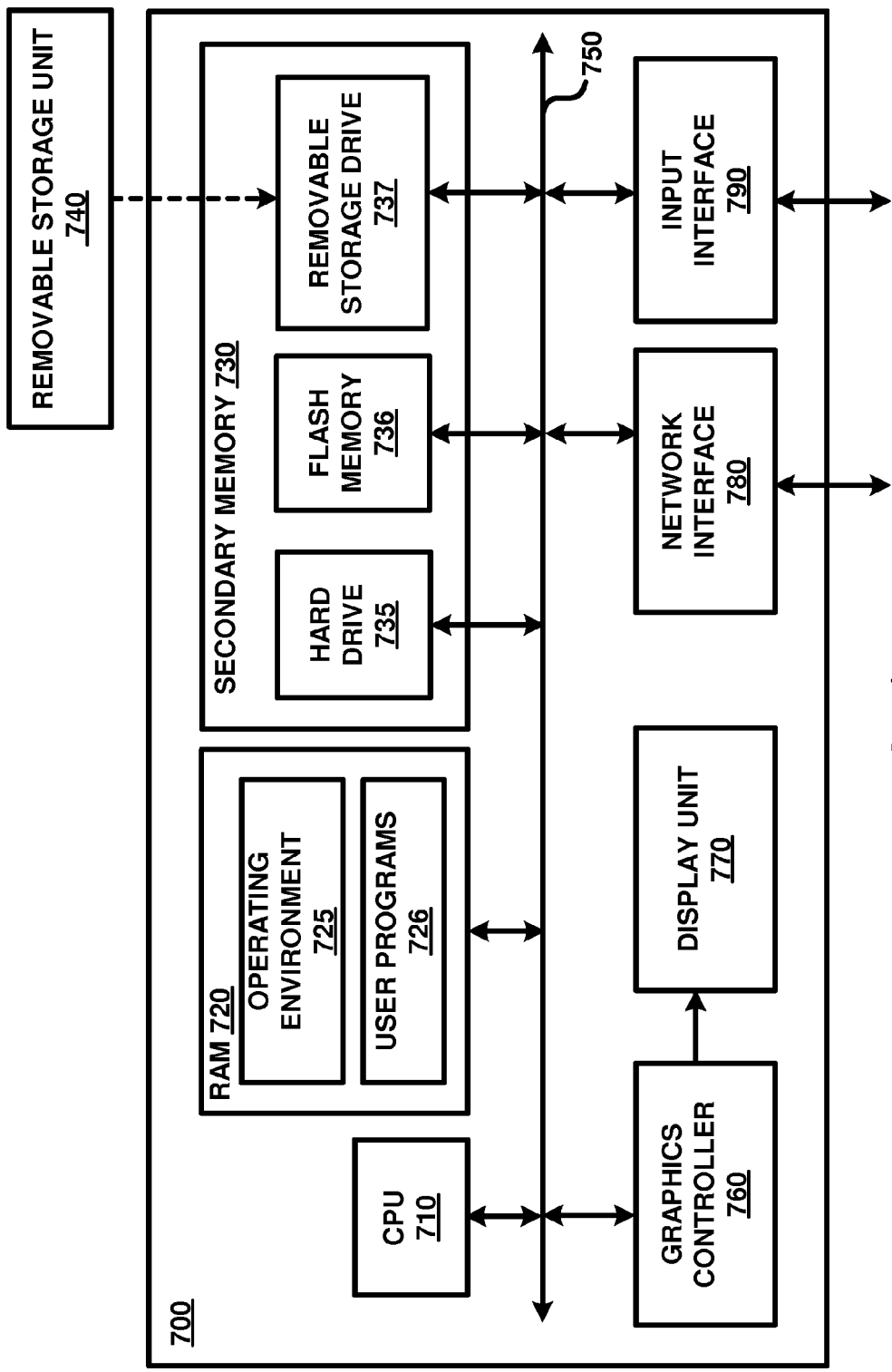
FIG. 7 is a block diagram illustrating the details of a digital processing system in which various aspects of the present invention are operative by execution of appropriate software instructions.

FIG. 7 is a block diagram illustrating the details of digital processing system 700 in which various aspects of the present invention are operative by execution of appropriate software instructions. Digital processing system 700 may correspond to any system executing ETL tool 150.

Digital processing system 700 may contain one or more processors (such as a central processing unit (CPU) 710), random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or user programs 726 (such as networking applications, database applications, etc.). Shared environment 725 contains utilities shared by user programs, and such shared utilities include operating system, device drivers, virtual machines, flow engine, etc., which provide a (common) run time environment for execution of user programs/applications.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide the user inputs required for several aspects of the present invention. Network interface 780 provides connectivity to a network (e.g., using Internet Protocol), and may be used to communicate with other connected systems (such as transaction database 170, data warehouse 180, etc.) of FIG. 1.

Secondary memory 730 may contain hard drive 735, flash memory 736, and removable storage drive 737. Secondary memory 730 may store the data (for example, portions of the data shown in FIGS. 5 and 6A-6B, etc.) and software instructions (for example, for performing the steps of FIG. 3), which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of updating rows in a data warehouse, said method comprising:

receiving a first plurality of data elements;

allocating respective unique identifier of a sequence of identifiers to each of said plurality of rows such that each row is uniquely identified by the respective allocated identifier;

inserting in a target table a plurality of rows, said target table being located in said data warehouse, each of said plurality of rows including a respective data element of said first plurality of data elements and the corresponding unique allocated identifier, said plurality of rows being located in said target table according to an order defined based on said sequence of identifiers, wherein a first data element of said first plurality of data elements is stored in a first row of said plurality of rows, said first row being allocated a first identifier of said sequence of identifiers;

receiving a second plurality of data elements as updates to respective rows, each of said second plurality of data elements being associated with corresponding unique identifier of said sequence of identifiers, wherein said second plurality of data elements includes a second data element associated with said first identifier, wherein said second plurality of data elements are received after said inserting of said first plurality of data elements;

sorting said second plurality of data elements according to said order of the associated unique identifiers such that each of said second plurality of data elements has a corresponding position in a sorted sequence; and updating said plurality of rows of said target table with said second plurality of data elements sorted in said order, wherein updating of each row identified by an identifier comprises storing in the row, the corresponding one of the second plurality of data elements having the same identifier such that said first data element in said first row is modified to equal said second data element upon said updating, wherein said updating processes data elements in earlier positions of said sorted sequence before processing data elements in later positions of said sorted sequence such that rows having associated unique identifiers in earlier positions in said sequence of identifiers are updated before rows having associated unique identifiers in later positions in said sequence of identifiers.

2. The method of claim 1, wherein rows of said target table are stored as a plurality of data blocks on a persistent storage, wherein each data block stores rows having a corresponding minimum identifier and a corresponding maximum identifier together defining a corresponding identifier range for the data block, wherein said inserting stores said plurality of rows in said plurality of data blocks such that the identifier ranges of no two data blocks overlap, wherein said updating comprises:
  reading from said persistent storage into a memory, the rows stored in a corresponding data block;
  processing a set of data elements having associated unique identifiers within the identifier range of said corresponding data block to cause each of the set of data elements to be stored in the corresponding row; and
  storing in said corresponding data block, the rows in said memory, with the set of data elements in the rows.

3. The method of claim 2, wherein said sequence of identifiers comprises values of a primary key of said target table.

4. The method of claim 3, further comprising:
  retrieving a second plurality of rows from a source table, wherein each of said second plurality of rows includes an associated unique identifier as a foreign key matching said primary key; and
  computing said second plurality of data elements based on the data in the second plurality of rows.

5. The method of claim 4, wherein said source table is a fact table and said target table is a dimension table,
  and wherein said computing aggregates at least some of the data elements in said fact table to generate said second plurality of data elements,
  whereby said updating updates the data elements of a column in said dimension table based on data in said fact table,
  whereby the number of reads of data blocks storing said fact table is reduced.

6. The method of claim 5, wherein said retrieving, said computing and said sorting are performed by executing an Structured Query Language (SQL) query.

7. The method of claim 3, further comprising:
  retrieving a second plurality of rows from a source table which does not have a foreign key matching said primary key;
  performing a join of said second plurality of rows with corresponding rows of said target table to collate the corresponding identifiers to respective ones of said second plurality of rows, wherein said join is performed on a common column present in both said source table and said target table; and
  computing said second plurality of data elements based on the data in the second plurality of rows.

8. The method of claim 7, wherein said source table is a first fact table and said target table is a second fact table.

9. A non-transitory machine readable medium storing one or more sequences of instructions for causing a system to update rows in a data warehouse, wherein execution of said one or more sequences of instructions by one or more processors contained in said system causes said system to perform the actions of:
  receiving a first plurality of data elements;
  allocating respective unique identifier of a sequence of identifiers to each of said plurality of rows such that each row is uniquely identified by the respective allocated identifier;
  inserting in a target table a plurality of rows, said target table being located in said data warehouse,
  each of said plurality of rows including a respective data element of said first plurality of data elements and the corresponding allocated identifier, said plurality of rows being located in said target table according to an order defined based on said sequence of identifiers,
  wherein a first data element of said first plurality of data elements is stored in a first row of said plurality of rows, said first row being allocated a first identifier of said sequence of identifiers;
  receiving a second plurality of data elements as updates to respective rows, each of said second plurality of data elements being associated with corresponding unique identifier of said sequence of identifiers,
  wherein said second plurality of data elements includes a second data element associated with said first identifier,
  wherein said second plurality of data elements are received after said inserting of said first plurality of data elements;
  sorting said second plurality of data elements according to said order of the associated unique identifiers such that each of said second plurality of data elements has a corresponding position in a sorted sequence; and
  updating said plurality of rows of said target table with said second plurality of data elements sorted in said order,
  wherein updating of each row identified by an identifier comprises storing in the row, the corresponding one of the second plurality of data elements having the same identifier such that said first data element in said first row is modified to equal said second data element upon said updating,
  wherein said updating processes data elements in earlier positions of said sorted sequence before processing data elements in later positions of said sorted sequence such that rows having associated unique identifiers in earlier positions in said sequence of identifiers are updated before rows having associated unique identifiers in later positions in said sequence of identifiers.

10. The non-transitory machine readable medium of claim 9, wherein rows of said target table are stored as a plurality of data blocks on a persistent storage,
  wherein each data block stores rows having a corresponding minimum identifier and a corresponding maximum identifier together defining a corresponding identifier range for the data block,
  wherein said inserting stores said plurality of rows in said plurality of data blocks such that the identifier ranges of no two data blocks overlap,
  wherein said updating comprises:
    reading from said persistent storage into a memory, the rows stored in a corresponding data block; processing a set of data elements having associated unique identifiers within the identifier range of said corresponding data block to cause each of the set of data elements to be stored in the corresponding row; and
    storing in said corresponding data block, the rows in said memory, with the set of data elements in the rows.

11. The non-transitory machine readable medium of claim 10, wherein said sequence of identifiers comprises values of a primary key of said target table.

12. The non-transitory machine readable medium of claim 11, further comprising one or more instructions for:
  retrieving a second plurality of rows from a source table, wherein each of said second plurality of rows includes an associated unique identifier as a foreign key matching said primary key; and
  computing said second plurality of data elements based on the data in the second plurality of rows.

13. The non-transitory machine readable medium of claim 12, wherein said source table is a fact table and said target table is a dimension table, and wherein said computing aggregates at least some of the data elements in said fact table to generate said second plurality of data elements, whereby said updating updates the data elements of a column in said dimension table based on data in said fact table whereby the number of reads of data blocks storing said fact table is reduced.

14. The non-transitory machine readable medium of claim 11, further comprising one or more instructions for:
retrieving a second plurality of rows from a source table which does not have a foreign key matching said primary key;
performing a join of said second plurality of rows with corresponding rows of said target table to collate the corresponding identifiers to respective ones of said second plurality of rows, wherein said join is performed on a common column present in both said source table and said target table; and
computing said second plurality of data elements based on the data in the second plurality of rows.

15. The non-transitory machine readable medium of claim 14, wherein said source table is a first fact table and said target table is a second fact table.

16. A data warehouse comprising:
a processor;
a random access memory (RAM);
a non-volatile storage to store a plurality of tables, said plurality of tables comprising a target table storing a first plurality of data elements in the form of a plurality of rows, wherein each of said plurality of rows is stored including a respective data element of said first plurality of data elements and a corresponding unique identifier allocated from a sequence of identifiers such that each row is uniquely identified by the respective allocated identifier, wherein said plurality of rows are located in said target table according to an order defined based on said sequence of identifiers, wherein a first data element of said first plurality of data elements is stored in a first row of said plurality of rows, said first row being allocated a first identifier of said sequence of identifiers;
a machine readable medium to store a first set of instructions which when retrieved into said RAM and executed by said processor forms an extract-transform-load (ETL) tool, said ETL tool designed to performs the actions of:
receiving a second plurality of data elements as updates to respective rows of said target table, each of said second plurality of data elements being associated with corresponding unique identifier of said sequence of identifiers,
wherein said second plurality of data elements includes a second data element associated with said first identifier,
wherein said second plurality of data elements are received after said first plurality of data elements are stored in said first table;
sorting said second plurality of data elements according to said order of the associated unique identifiers such that each of said second plurality of data elements has a corresponding position in a sorted sequence; and
updating said plurality of rows of said target table with said second plurality of data elements sorted in said order,
wherein updating of each row identified by an identifier comprises storing in the row, the corresponding one of the second plurality of data elements having the same identifier such that said first data element in said first row is modified to equal said second data element upon said updating,
wherein for updating, said ETL tool processes data elements in earlier positions of said sorted sequence before processing data elements in later positions of said sorted sequence such that rows having associated unique identifiers in earlier positions in said sequence of identifiers are updated before rows having associated unique identifiers in later positions in said sequence of identifiers.

17. The data warehouse of claim 16, wherein rows of said target table are stored as a plurality of data blocks on said non-volatile storage,
wherein each data block stores rows having a corresponding minimum identifier and a corresponding maximum identifier together defining a corresponding identifier range for the data block,
wherein said plurality of rows is stored in said plurality of data blocks such that the identifier ranges of no two data blocks overlap,
wherein said updating comprises:
reading from said persistent storage into a memory, the rows stored in a corresponding data block;
processing a set of data elements having associated unique identifiers within the identifier range of said corresponding data block to cause each of the set of data elements to be stored in the corresponding row; and
storing in said corresponding data block, the rows in said memory, with the set of data elements in the rows.

18. The data warehouse of claim 17, wherein said target table is a dimension table and said sequence of identifiers comprises values of a primary key of said dimension table, wherein said ETL tool further performs the actions of:
retrieving a second plurality of rows from a fact table, wherein each of said second plurality of rows includes an associated unique identifier as a foreign key matching said primary key, said plurality of tables comprising said fact table; and
computing aggregates of at least some of the data elements in said second plurality of rows to generate said second plurality of data elements,
wherein said updating updates the data elements of a column in said dimension table based on data in said fact table.

19. The data warehouse of claim 18, wherein said retrieving, said computing and said sorting are performed by executing an Structured Query Language (SQL) query.

20. The data warehouse of claim 16, wherein said target table is a first fact table and said sequence of identifiers comprises values of a primary key of said first fact table, wherein said ETL tool further performs the actions of:
retrieving a second plurality of rows from a second fact table which does not have a foreign key matching said primary key, said plurality of tables comprising said second fact table;
performing a join of said second plurality of rows with corresponding rows of said first fact table to collate the corresponding identifiers to respective ones of said second plurality of rows, wherein said join is performed on a common column present in both said first fact table and said second table; and
computing said second plurality of data elements based on the data in the second plurality of rows.

* * * * *